April 29, 1969 L. J. WALLACE 3,441,206

CASH REGISTER WITH MEANS FOR PRODUCING ELECTRONIC DATA PROCESSING INPUT RECORD

Filed Oct. 15, 1965 Sheet 1 of 3

INVENTOR
Leroy J. Wallace
by McDougall, Hersh & Scott
Attys

INVENTOR
Leroy J. Wallace
by McDougall, Hersh & Scott
Att'ys

April 29, 1969 L. J. WALLACE 3,441,206

CASH REGISTER WITH MEANS FOR PRODUCING ELECTRONIC DATA PROCESSING INPUT RECORD

Filed Oct. 15, 1965 Sheet 3 of 3

1

3,441,206
CASH REGISTER WITH MEANS FOR PRODUCING ELECTRONIC DATA PROCESSING INPUT RECORD

Leroy J. Wallace, Oak Park, Ill.
(5252 N. Broadway, Chicago, Ill. 60640)

Filed Oct. 15, 1965, Ser. No. 496,482
Int. Cl. G06c 29/00
U.S. Cl. 235—60.29 5 Claims

ABSTRACT OF THE DISCLOSURE

A cash register, comprising a plurality of Amount Keys for recording monetary amounts, a plurality of registers for accumulating monetary amounts for various departments, a plurality of department keys for routing each monetary amount to a selected register, an arithmetic unit for accumulating the monetary amounts corresponding to at least some of said department keys, at least one total key for causing said arithmetic unit to compute totals, an EDP record unit for producing entries on an EDP record, a plurality of Print Keys adjacent said Amount Keys for producing entries of informational data on the EDP record, means for producing entries on the EDP record corresponding to the monetary amounts entered upon said registers, means for producing EDP record entries corresponding to the totals computed by said arithmetic unit, a plurality of preliminary program keys for disconnecting the Amount Keys from said registers and connecting said Amount Keys to said EDP record unit for producing entries thereon corresponding to preliminary informational data whereby both said Print Keys and said Amount Keys may be employed for making entries of preliminary informational data on the EDP record, means for making EDP record entries identifying the selected preliminary program keys, means for making EDP record entries identifying the selected department keys, transaction counters for counting the number of transactions recorded by at least some of the said department keys, a validation printer for imprinting documents with monetary amounts, a read key, and a printer operable by said read key for printing the accumulated amounts on said registers.

This invention relates to cash registers or similar machines.

One object of the present invention is to provide a new and improved cash register which will register all of the financial aspects of a complicated sales transaction, such as the sale of an automobile, for example, while simultaneously producing a record adapted to be employed as the input for an electronic data processing machine or computer, so that all aspects of all transactions recorded on the cash register may be analyzed periodically by the electronic data processing machine.

For convenience, the record which may be employed as the input for the electronic data processing machine may be called the EDP record. Such record may be in any known or convenient form which is usable as the input for a computer. Thus, for example, the EDP record may be in the form of a continuous punched paper tape, a series of punched cards, optical fount tape, magnetic tape, or cards imprinted with magnetic ink.

A further object is to provide a new and improved

2 cash register which will perform a large number of complex functions in connection with the recording of a sales transaction or the like, including the following:

(1) Produce an EDP record of the date, the identity of the dealer or store, and the particular branch or plant in which the transaction occurs.

(2) Produce an EDP record of the identity of the salesman or clerk, and the document or serial number of the sales slip in connection with each transaction.

(3) Produce an EDP record of the items being sold and the customer to whom it is being sold in connection with each transaction.

(4) Register the basic price of the item on a selected register, while simultaneously making an EDP record of the price and the identity of the selected register.

(5) Register other price factors, such as charges for freight and accessories, on other selected registers, while simulaneously making an EDP record of such price factors and the identity of the registers.

(6) Compute and indicate the total price.

(7) Register negative factors, such as trade-in allowances, to be subtracted from the price, and simultaneously produce an EDP record of such negative factors and the identity of the selected registers.

(8) Compute and indicate the net price to be charged to the customer.

(9) Register the down-payment received from the customer and simultaneously make an EDP record of such down-payment and the identity of the register on which it is entered.

(10) Compute and indicate the net balance to be financed, charged to accounts receivable, or paid in cash.

(11) Validate the sales slip, and all carbon copies thereof, by imprinting all of the foregoing entries thereon.

(12) Register the basic cost of the item on a selected register, and simultaneously make an EDP record of such cost and the identity of the register.

(13) Register other cost factors, such as labor and parts, on selected registers, and simultaneously produce an EDP record of such cost factors and the identity of the selected registers.

(14) Product a reading of the total recorded on any of the various registers at any time, so that the cash in the register may be audited, and so that periodic reports of total sales, gross profit and other factors may be prepared.

(15) Register the total number of transactions recorded by selected registers of the machine since the last time it was cleared.

(16) Provide a clearance of the machine at the end of the day or at periodic intervals.

It is a further object of the present invention to provide a new and improved cash register which produces a direct EDP record and thus eliminates any need for manually converting the data recorded on the sales slips into a form suitable for EDP input.

Another object is to provide a new and improved cash register which produces an EDP record on a strictly current basis, so that a minimum of delay will be experienced in obtaining EDP analysis and tabulation of the sales recorded by the cash register. Thus, EDP reports will be available very quickly as to many factors of interest to the management of the business, including sales figures broken down and tabulated by item, department, salesman, and other categories; cost figures tabulated as to items and departments; labor figures tabulated for each mechanic or other workman; and profit figures tabulated by item, department, salesman or other categories.

A further object is to provide a new and improved cash register which includes a large number of separate registers for recording various types of entries, together with means for producing readings of the totals on any or all of the registers, so that reports as to sales, profits and the like may be prepared at frequent intervals.

Another object is to provide a new and improved cash register which makes it possible to eliminate much of the manual bookkeeping and computation heretofore necessary in connection with the analysis of sales transactions.

Further objects and advantages of the present invention will appear from the following description, taken with the accompanying drawings, in which.

Figure 1:
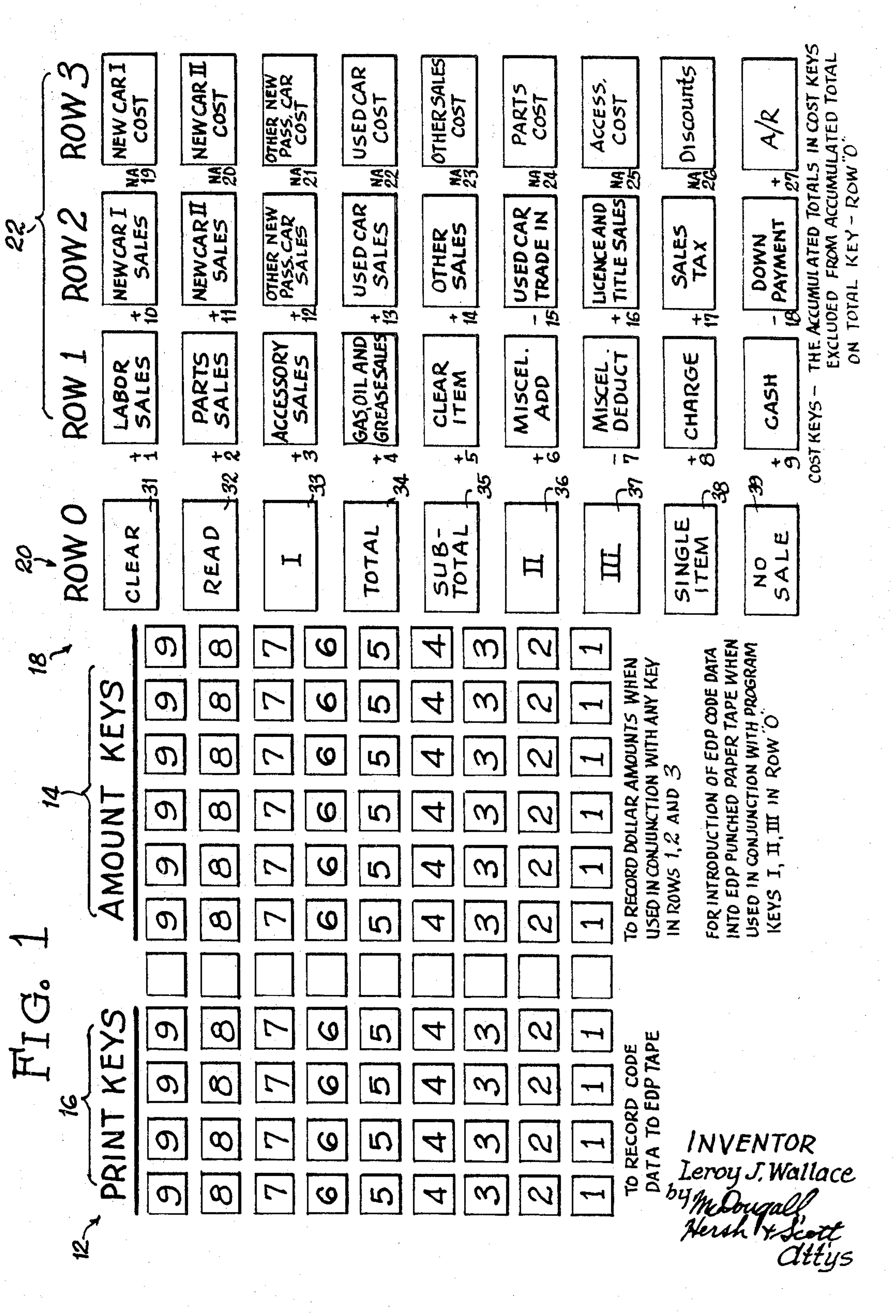
FIG. 1 is a diagrammatic elevational view showing the keyboard of a cash register to be described as an illustrative embodiment of the present invention.
Figure 2:
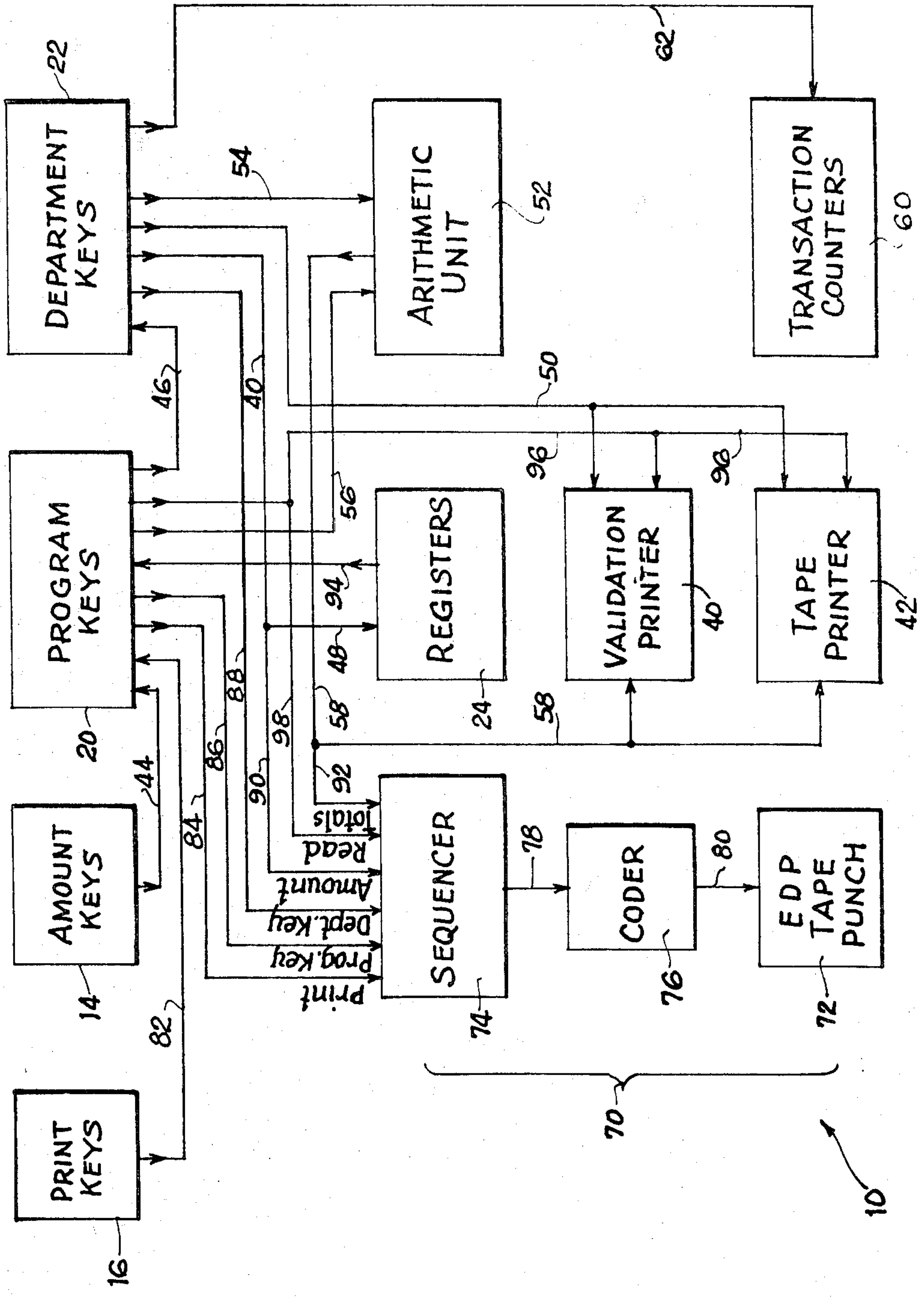
FIG. 2 is a schematic block diagram showing the cash register.

As already indicated, FIGS. 1 and 2 illustrate a cash register 10 having a keyboard 12, illustrated diagrammatically in FIG. 1. The keyboard 12 comprises a set of Amount Keys 14, for registering dollar amounts. Such Amount Keys will be familiar to all users of cash registers. The number of Amount Keys may be varied in accordance with the number of digits to be handled by the cash register. In the illustrated keyboard 12, there are six rows of Amount Keys for ringing up dollar amounts ranging up to six digits. Thus, any amount up to $9,999.99 may be registered in a single operation. In accordance with the usual arrangement, there are nine keys in each row of the Amount Keys.

Alongside the Amount Keys 14, the keyboard 12 is provided with four rows of Print Keys 16. Here again, each row comprises nine keys. The Print Keys 16 resemble the Amount Keys 14 but are employed to record identifying numbers which are to be entered on the EDP record. In this case, the EDP record takes the form of a punched tape 18, as diagrammatically illustrated in FIG. 3. However, the EDP record may be in the form of punched cards, or any other form which is usable as the input for an electronic data processing machine.

The number of rows of the Print Keys 16 may be varied in accordance with the number of digits to be recorded on the EDP record. The illustrated machine is capable of recording four digits as a code number or numbers on the EDP record, in conjunction with the recording of each dollar amount as registered on the Amount Keys 14. In addition, at certain stages in the operation of the cash register, the Amount Keys 14 may also be employed to record code numbers or other data on the EDP record, rather than being used for registering dollar amounts. Thus, the cash register is capable of recording a code number or numbers up to 10 digits, by using both the Print Keys and the Amount Keys 14.

The keyboard 12 of the illustrated cash register 10 is provided with four rows of function keys 18, in addition to the Amount Keys 14 and Print Keys 16. In this case, the Print Keys 16 are to the left of the Amount Keys 14, while the function keys 18 are to the right. The four rows of function keys 18 are designated Row 0, Row 1, Row 2, and Row 3. Each row contains nine keys. In this case, the keys of Row 0 constitute program keys 20, while the keys of Rows 1, 2 and 3 constitute department or register keys 22. Generally speaking, the program keys 20 are operated to determine the programming of the cash register. One of the department keys 22 is operated whenever a dollar amount is entered on the Amount Keys 14. The selected department key indicates the department or category to which the dollar amount belongs. The cash register is arranged so that the dollar amounts for each category are registered and accumulated separately.

As indicated in FIG. 2, the cash register 10 comprises a plurality of registers 24, corresponding in number to the department keys 22. Thus, there is a separate register for each of the department keys 22. The illustrated cash register has twenty-seven department keys and twenty-seven registers on which the dollar amounts rung up on each department key are separately registered and accumulated. As shown in FIG. 1, the department keys are numbered 1–27 on the keyboard 12, so that the keys may be identified in terms of their numbers on instruction sheets and procedure manuals for use by the operator of the cash register.

The department keys 22 may be assigned to various departments or categories, according to the nature of the business and the desire of the management. The illustrated cash register 10 is intended particularly for use by automobile dealers. Accordingly, the department keys 22 are assigned and designated in accordance with the particular needs of this business. Generally speaking, the department keys of Row 1 relate to miscellaneous or smaller transactions. The keys of Row 2 relate to sales of new or used automobiles. The keys of Row 3 relate to cost factors which underlie or are involved in sales transactions.

More specifically, keys 1–4 of Row 1 relate to sales in connection with the servicing of automobiles. These keys are designated as follows:

1—Labor Sales
2—Part Sales
3—Accessory Sales
4—Gas, Oil and Grease Sales.

Keys 5–9 of Row 1 are miscellaneous keys which cover a variety of situations. Key 5 is designated Clear Item and is employed to clear a dollar amount which has been erroneously entered on the Amount Keys.

Key 6 is designated Miscellaneous Add and is used to ring up miscellaneous sales and other similar transactions not covered by any of the other keys. Key 7 is designated Miscellaneous Deduct, which is employed to ring up miscellaneous deductions not covered by the other keys.

Key 8, designated Charge, is employed for recording dollar amounts which are to be charged to the customer. Key 9 is designated Cash and is employed to ring up the cash received from the customer.

Keys 10–14 of Row 2 relate directly to sales of new and used cars. These keys are designated as follows:

10—New Car I Sales
11—New Car II Sales
12—Other New Passenger Car Sales
13—Used Car Sales
14—Other Sales.

It will be evident that Keys 10 and 11 provide for the separate recording of sales of two different makes or models of cars. Key 12 may be employed for recording the sales of still other cars. Sales of trucks or other occasional sales may be recorded on Key 14.

Key 15 is designated Used Car Trade-In and is employed in ringing up the trade-in allowance being given to the customer for the car which he is trading in. Keys 16 and 17 are self-explanatory and are designated as follows:

16—License and Title Sales
17—Sales Tax

Key 18 is designated Down Payment and is employed for entering the down payment previously received from the customer.

Keys 19–23 of Row 3 are employed to record the cost to the dealer of the sales items represented by Keys 10–14. The designations of these cost keys are self-explanatory and are as follows:

19—New Car I Cost
20—New Car II Cost
21—Other New Passenger Car Cost
22—Used Car Cost
23—Other Sales Cost.

Keys 24 and 25 are employed to record the cost to the dealer of the sales items corresponding to Keys 2 and 3. These cost keys are designated as follows:

24—Parts Cost
25—Accessories Cost.

Key 26 is designated Discounts and is employed to record special discounts which are given to the customer.

Key 27 is a miscellaneous key designated Accounts Receivable and is employed in ringing up car sales to customers on open account.

The program keys 20 of Row 0 may have various designations in accordance with the specific functions to be carried out by the cash register. For convenience, the program keys will be identified as 31–39.

In the illustrated cash register, Key 31 is designated Clear and is employed to clear the entire cash register at the end of the day or at periodic intervals. Provision is normally made for locking this key so that it cannot be operated by unauthorized persons.

Key 32 is designated Read and is employed for obtaining a reading at any time of the total outstanding on any of the 27 registers represented by the department keys 22. The reading is obtained by pressing the Read key and then pressing the selected department key. A printed record of the total appearing on the corresponding register is then produced by the machine.

Key 33 is marked simply with the Roman numeral I, representing Program I, which is used at the beginning of the day for recording the necessary daily entries on the EDP record. Such daily entries may include the date, a code number identifying the company using the cash register, and another code number identifying the particular place of business or branch at which the cash register is located. This key is interlocked with the Clear Key 31 so that Key 33 cannot be operated until the Clear key has been operated to clear the cash register.

Keys 34 and 35 are designated Total and Subtotal, respectively. These keys are employed to direct the machine to make and print totals and subtotals in connection with the computations involved in complex sales transactions.

Key 36 is designated simply with the Roman numeral II, representing Program II, which is employed for making various entries in the EDP record in connection with each sales transaction. Such entries may include the code number of the salesman or clerk, and the document number of the sales slip. Key 36 may be interlocked with Key 33 so that Key 36 cannot be operated until Key 33 has been operated.

Key 37 is designated simply with the Roman numeral III, representing Program III, which is used for registering additional data, such as a stock number and a customer account number, after Program II has been completed. Key 37 is interlocked with Key 36 so that Key 37 cannot be operated until Key 36 has been operated. The operation of Key 37 activates the department keys 22, of Rows 1–3, so that dollar amounts may be entered upon any of the twenty-seven registers represented by the department keys. This phase of the operation may be considered to be Program IV, but no separate key is needed, because the machine automatically shifts to Program IV at the end of Program III.

Key 38 is designated Single Item and is employed to provide a short-cut for bypassing Keys 36 and 37 when it is desired to ring up a single insignificant item, such as a small cash sale to an unidentified customer. Such a transaction may be entered by pressing Key 38, entering the dollar amount on the Amount Keys 14, and pressing the appropriate department key 22.

Key 39 is designated No Sale and is employed for opening the cash drawer of the cash register to make change or for any other purpose not involving a sale.

As indicated in FIG. 2, the cash register 10 comprises a validation printer 40 and a tape printer 42. The validation printer 40 is employed to validate the sales slip for each sales transaction, by imprinting the sales slip with the dollar amounts involved in the particular transaction. All carbon copies of the sales slip are simultaneously imprinted. The tape printer 42 produces corresponding imprinted entries on paper tape. For the sale of automobiles, the validation printer 40 produces entries corresponding to all of the department keys 10–18 of Row 2. For automobile servicing transactions, the validation printer 40 produces entries corresponding to the department keys 1–4 of Row 1.

The cash register is provided with connecting means 44 between the Amount Keys 14 and the program keys 20 whereby the program keys control the functions to be performed by the Amount Keys. The program keys 33, 36, and 37, which control the programs designated I, II and III, are operative to disconnect the Amount Keys 14 from the registers 24, while connecting the Amount Keys to the EDP record unit 70. Further connecting means 46 extend between the program keys 20 and the department keys 22 whereby the dollar amounts received from the Amount keys 14 are routed to the appropriate registers 24. Thus, connecting means 48 also extend between the department keys and the registers 24.

Additional connecting means 50 extend between the department keys 22 and the validation printer 40 so that the dollar amounts corresponding to Keys 1–4 in Row 1 and Keys 10–18 in Row 2 will be printed by the validation printer 40, as already described. The connecting means 50 also extend to the tape printer 42.

The cash register comprises an arithmetic unit 52 for computing the totals and subtotals which are involved in registering the sales transactions. Connecting means 54 are provided between the department keys 22 and the arithmetic unit 52 for feeding the dollar amounts to the arithmetic unit. Additional connecting means 56 extend between the program keys 20 and the arithmetic unit 52 for causing the arithmetic unit 52 to perform addition and subtraction operations. The totals and subtotals are routed from the arithmetic unit 52 to the validation printer 40 and the tape printer 42 by additional connecting means 58.

The cash register is preferably provided with a set of transaction counters 60 for indicating the number of transactions which are rung up by the department keys 22. Thus, connecting means 62 are provided between the department keys 22 and the transaction counters 60. It is particularly advantageous to provide separate transaction counters for the keys which represent sales. These keys comprise Keys 1–4 of Row 1 and 10–18 of Row 2. However, it is also advantageous to provide transaction counters for Keys 6–9 of Row 1 and Keys 26 and 27 of Row 3. If desired, separate transaction counters may be provided for all of the department keys 22.

Figure 3:
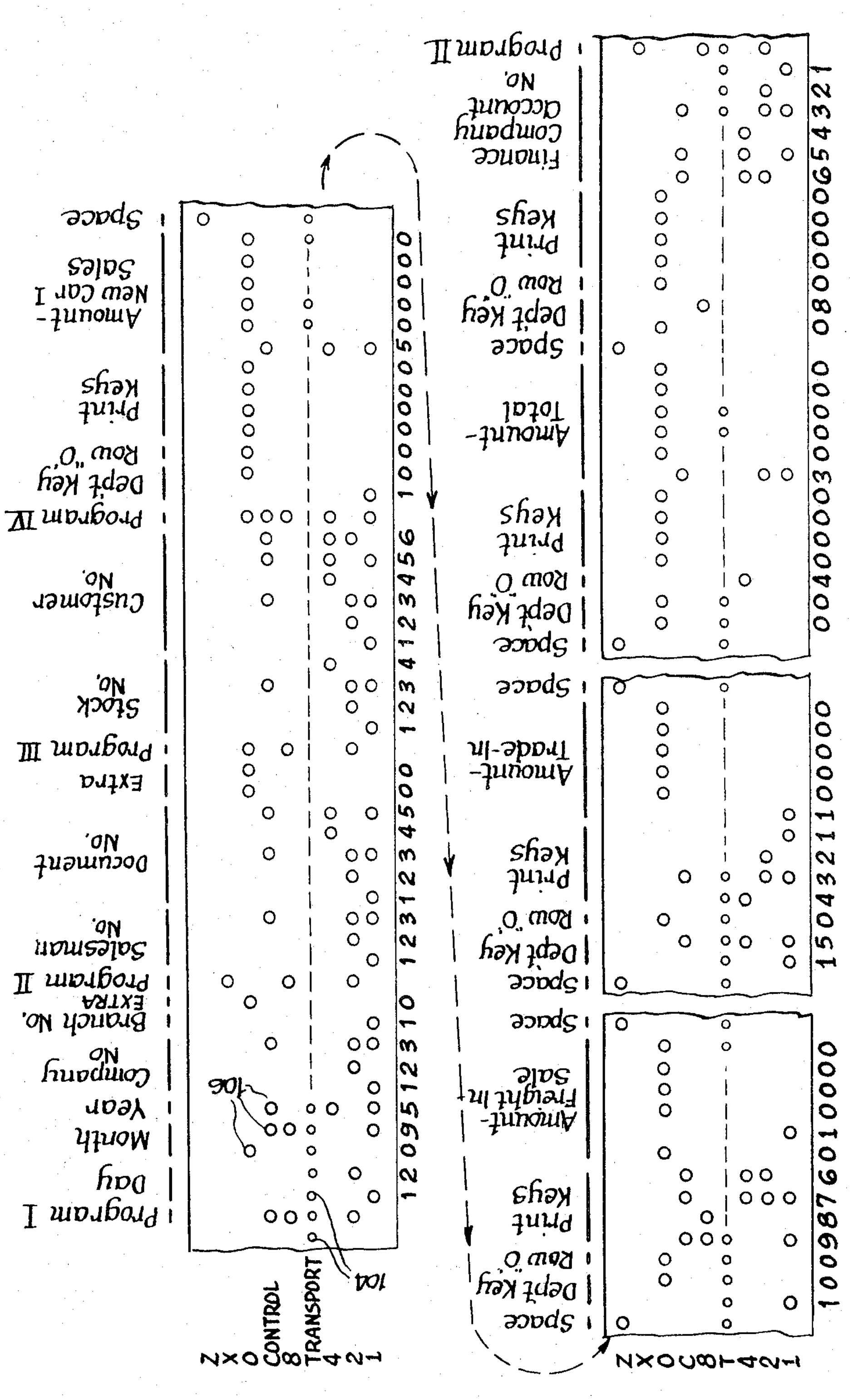
FIG. 3 is a diagrammatic view showing the punched tape which constitutes the EDP record produce by the cash register of FIGS. 1 and 2.

As already indicated, the cash register comprises an EDP record unit 70. In this case, the EDP record is in the form of a punched tape, as illustrated in FIG. 3. Thus, the EDP record unit includes a tape punch 72. In addition, the illustrated EDP record unit 70 comprises a sequencer 74 and a coder 76. The information to be recorded on the EDP tape is received simultaneously from the Print Keys 16, Amount Keys 14, program keys 20 and department keys 22. The sequencer 74 receives the mass of simultaneous information and feeds the various categories of information to the EDP tape punch 72 in sequence. The coder 76 generates code numbers corresponding to the various program keys 20 and department keys 22, so that such code numbers can be fed to the tape punch 72. Connecting means 78 and 80 are provided between the sequencer 74 and the coder 76, and between the coder 76 and the EDP tape punch 72.

Additional connections are employed to provide for the operation of the EDP record unit 70. Thus, connecting means 82 are provided between the Print Keys 16 and the program keys 20, whereby the information recorded on the Print Keys is fed to the program keys 20. Additional connecting means 84 are provided between the program keys 20 and the sequencer 74 to route the information from the Print Keys 16 and the Amount Keys 14 to the sequencer.

Further connections are provided to identify the program keys and department keys which are operated. For this purpose, additional connecting means 86 are provided between the program keys 20 and the sequencer 74. For the same purpose, connecting means 88 are provided between the department keys 22 and the sequencer 74.

The dollar amounts fed to the registers 24 are also fed to the sequencer 74 by additional connecting means 90. Similarly, the totals supplied by the arithmetic unit 52 are transmitted to the sequencer 74 by additional connecting means 92.

To provide for the reading of the totals accumulated on the registers 24, connecting means 94 are provided between the registers 24 and the program keys 20. The readings from the registers 24 are routed to the printers 40 and 42 by connecting means 96. Such readings are routed to the sequencer 74 by connecting means 98.

It will be convenient to present further details of the cash register in connection with a detailed consideration of the operation of the cash register. At the beginning of each day, Program I is followed to record daily lead information, which applies to all of the transactions for the day. It is highly advantageous to provide this information for the EDP record. The daily lead information may comprise the date, a company identification number, and a plant or branch identification number. Both the Print Keys 16 and the Amount Keys 14 are employed to record the daily lead information. Thus, for example, the four rows of Print Keys and the first row of Amount Keys may be employed to record the date, which requires five digits for proper recording. The next three rows of Amount Keys may be employed to record the company identification as a three digit number. The branch number may be recorded in the next row of Amount Keys as a single digit. This makes a total of nine digits to be recorded as daily lead information. Inasmuch as ten digits are available, either the company identification or the branch number may be increased by one digit if desired.

The recording of the daily lead information is completed by depressing the Program I key, which is Key 33 in Row 0. The operation of this key causes the nine or ten digit number recorded on the Print Keys 16 and the Amount Keys 14 to be recorded on the EDP record by the EDP tape punch 72. A code number corresponding to the Program I key is also recorded on the EDP record, preferably ahead of the daily lead information.

The cash register is now ready to be used for ringing up sales transactions. The cash register is interlocked so that the Program I key must be depressed before sales transactions can be entered.

When a sales transaction is to be recorded, the first step is to enter certain transaction lead information. This information applies to the entire sales transaction. The transaction lead information may comprise a salesman identification number, a document number, a stock number, and a customer account number. It is highly desirable that all of this information be entered on the EDP record. This transaction lead information may be recorded in two stages in order to provide a sufficient number of digits. In the first stage, Program II is followed. The salesman identification number may be recorded as three digits on the first three rows of the Print Keys 16. The document number may be entered as five digits on the first five rows of Amount Keys. One additional digit is available for each of these numbers and may be used, if desired. The entry of these numbers is completed by depressing Program Key II in Row 0. This causes the EDP tape punch 72 to enter the salesman number and the document number on the EDP record.

The entry of the salesman identification number makes it possible for the electronic data processing machine to analyze and tabulate the sales, gross profit and other factors attributable to each salesman. The document number is the number of the sales slip, so that the EDP recording is tied definitely to the sales slips for auditing purposes.

In the second stage of recording the transaction lead information, Program III is followed. The stock number of the car or other item being sold may be recorded as four digits on the four rows of Print Keys. The customer account number may be recorded as six digits on the Amount Keys. The entry of this information is completed by depressing Program Key III in Row 0. As a result, these numbers are recorded on the EDP tape punch 72. The stock number may be assigned so as to identify the car or other item by model, color and other identifying features. The entry of this information on the EDP record makes it possible to prepare an EDP analysis and tabulation of sales and profits by the various car models and types. The customer account number identifies the customer for EDP analysis of the recorded sales data according to customer.

The cash register is now ready for the entry of the dollar amounts involved in the sales transaction. The machine may be interlocked so that dollar amounts cannot be entered until Program Keys II and III have been operated in the proper sequence. Interlocking may be such that the Program II key must be operated before the Program III key can be operated.

In describing the entry of the dollar amounts, it will be assumed that the sales transaction involves the following dollar amounts:

| | Sales | Cost |
|---|---|---|
| Sales, new car class I (list price $5,500) | $5,000 | $4,000 |
| Freight in | 100 | 75 |
| Accessories | 200 | 125 |
| Sub-total | 5,300 | 4,200 |
| Used car trade-in allowance | 1,000 | |
| Sub-total | 4,300 | |
| Licenses and title | 23 | |
| Sales tax | 172 | |
| Net charge to customer | 4,495 | |
| Down payment | 1,495 | |
| Net balance to be financed, charged to the customer or paid in cash | 3,000 | |

The first item of $5000 is recorded in the category of New Car I sales by entering the amount on the Amount Keys and depressing department key 10 in Row 2.

The second item is a discount of $500 off the list price, which is entered by recording the amount on the Amount Keys and depressing department key 26 in Row 3, designated Discounts.

As the third item, car cost of $4000 is entered by recording the amount of the Amount Keys and depressing department key 19 in Row 3, designated New Car I Cost.

The fourth item, comprising the freight of $100, is recorded under the category of New Car I Sales, but a code number representing freight in is recorded on the Print Keys for EDP analysis of the total freight. The amount is then recorded on the Amount Keys, and the entry is completed by depressing department key 10 in Row 2.

The fifth item to be recorded is the freight in cost of $75, which, however, is entered under the category New Car I Cost by recording the code number for freight in on the Print Keys, recording the amount on the Amount Keys, and depressing key 19 in Row 3. The use of the code number makes it possible to prepare an EDP analysis of the freight in cost.

The sixth item to be recorded is the accessories sale of $200. Here again, a code number representing accessories is recorded on the Print Keys. The entry is completed by recording the amount on the Amount Keys and depressing Key 10, in Row 2, designated New Car I Sales.

As the seventh item, the cost of the accessories, amounting to $125, is recorded by recording the code number for accessories on the Print Keys, recording the amount on the Amount Keys, and depressing department key 19 in Row 3, representing New Car I Cost.

The eighth item is the gross sale of $5300, which is derived by depressing the Subtotal key in Row 0.

As the ninth item, the trade-in of $1000 is entered by using the Print Keys to record the stock number assigned to the used car being traded-in, entering the amount on the Amount Keys, and depressing department key 15 in Row 2, representing used car trade-in.

The tenth item is the net sale of $4300, which is derived by depressing the Subtotal key in Row 0.

As the eleventh item, the licenses and title charges of $23 are recorded by entering the amount on the Amount Keys and depressing department key 16 in Row 2, representing license and title sales.

As the twelfth item, the sales tax $172 is entered by recording the amount on the Amount Keys and depressing department key 17 in Row 2, designated Sales Tax.

The net charge to the customer is the thirteenth item and is derived simply by depressing the Subtotal key in Row 0.

As the fourteenth item, the down payment previously advanced by the customer is entered by recording the amount of $1495 on the Amount Keys and depressing department key 18 in Row 2, designated Down Payment.

The fifteenth item is the total to be financed, charged to the customer, or paid in cash. This amount is derived simply by depressing the Total key in Row 0.

The sixteenth and final operation is the entry of the mode of customer settlement by depressing either department key 8 or key 9 in Row 1. For a cash sale, department key 9 is depressed. When the total of $3000 is to be charged to the customer, the account number of the customer is recorded on the Amount Keys, and the entry is completed by depressing Key 8 of Row 1. If the total is to be financed, the account number of the finance company is recorded on the Amount Keys, and the entry is completed by depressing Key 8 in Row 1. The entry of the identifying numbers makes it possible to prepare EDP analyses of customer and finance company accounts.

The depression of the Total key in Row 0, followed by the entry of the customer settlement on either Key 8 or Key 9 in Row 1, terminates the entry of the transaction and clears the arithmetic unit so that the cash register is ready for the entry of another sales transaction. It is then necessary to go through Programs II and III as before.

The operation of each department key causes the dollar amount to be entered and accumulated on the corresponding register 24. Simultaneously, an entry of the dollar amount is made on the EDP record, along with one or more code numbers identifying the department key.

As alerady indicated, FIG. 3 illustrates a punched tape 102 which constitutes the EDP record produced by the cash register. Any other suitable type of EDP record may be employed. The illustrated tape 102 is formed with a continuous series of spaced transport or sprocket holes 104. Opposite each of the transport holes 104 the tape 102 may be punched with a plurality of other holes 106 which are larger than the transport holes 104, and which represent numbers or other bits of data to be recorded on the EDP record. Provision may be made for any desired number of the holes 106 opposite each of the transport holes 104. In the illustrated tape 102, provision is made for eight such holes, representing eight digits or bits of information.

As indicated by the legends in FIG. 3, the eight positions for the holes 106 are designated 1, 2, 4, 8, Control, 0, X and Z. The five positions designated 1, 2, 4, 8, and 0 may be employed singly and in combination, to represent any number from 0 to 9. When these positions are used in combination, a hole is also punched in the control position, to indicate that the holes are to be considered in combination and not individually.

The position designated X may be employed for producing programming signals and other code designations. The position Z is employed to indicate a space between successive items which are involved in the same general transaction, without a change in programming.

Various fragments of the tape 102 are shown in FIG. 3, representing portions of the record for the specific transaction described in detail above. It may be helpful to undertake a detailed description of the manner in which the illustrated fragments of the tape 102 are punched.

A few of the transport holes 104 are shown near the beginning of each tape fragment. It will be understood that the transport holes 104 are punched at regular intervals along the entire length of the tape.

As indicated by the legend Program I, the tape begins with a code character which marks the beginning of Program I. This code character happens to comprise holes in the positions designated 2, 8, and Control. The following characters represent the daily lead information comprising the day, month, year, company number, and branch number. Two digits are used for the day, two for the month, one for the year, three for the company number, and one for the branch number. It will be evident that the date punched on the tape is the 12th of September, 1965. The companying number is 123 and the branch number is 1. These numbers in the daily lead information represent a total of nine digits which are recorded on the Print Keys and the Amount Keys. Inasmuch as ten digits are available, the next character is an extra 0.

Then follows a code character representing the beginning of Program II. This character happens to comprise the combination of 2, 8, and X. The following characters represent the first portion of the transaction lead information, comprising the salesman number, and the document number. It will be evident that the salesman number is 123, while the document number is 12345. It will be recalled that these numbers are recorded on the Print Keys and the Amount Keys. The numbers comprise a total of eight digits. Inasmuch as ten digits are available, the next two characters are extra zeros.

The next following character is the code for Program III, which happens to comprise holes representing 2, 8, and 0. The next ten characters represent the second portion of the transaction lead information, comprising the stock number, which is 1234, and the customer number, which is 123456.

Next, the tape is punched with the code for Program IV, which automatically follows Program III. The code for Program IV happens to be the combination of holes for 1, 4, 8, Control and 0. The combination which follows on the tape corresponds to the specific transaction already described in detail. The first two characters identify the department key, which is Key 10 as already indicated. The next character is reserved for Row 0, to indicate whether any key in this row has been pressed, other than the Program Keys I, II and III. In this case no other key has been pressed, so that a zero appears in this position.

The next four characters are reserved for the Print Keys, to record any code numbers which may have been entered on the Print Keys. For this particular item, the Print Keys were not used, so that all of the characters are zeros.

The following six characters represent the amount entered on the Amount Keys. Such amount was $5000.00. Inasmuch as this is the end of the item, the next character is a hole in the Z position representing a space.

The next fragment of the tape 102 to be illustrated in FIG. 3 is the portion of the record representing the freight-in sale of $100.00. As before, the tape is punched with the department number, 10, and the Row 0 record, which is 0. The next four characters represent the code number for freight-in, which is 9876, as entered on the Print Keys. The following six characters represent the amount of $100.00. At the end of this item, another space hole appears in the Z position.

The third fragment of the tape 102 represents the portion for the trade-in item of $1000.00. As before, the first two characters represent the department, 15, and the next character constitutes the record for Row 0, which is 0. The next four characters represent the stock number assigned to the used car being traded in. This stock number is 4321, as entered on the Print Keys. The next six characters represent the amount of $1000.00, followed by a space hole in the Z position.

The final fragment of the tape 102, as illustrated in FIG. 3, represents the total item and the customer settlement. The first two characters are zeros, indicating that none of the department keys is being used. The record for Row 0 is 4, identifying the Total key. The next four characters are zeros, representing the unused Print Keys. The following six digits represent the total amount of $3000.00 as computed by the arithmetic unit 52. A space hole then appears in the Z position.

As to the customer settlement, the first two characters indicate the number 8, of the Charge key. The record for Row 0 is 0. The next four characters are zeros, representing the unused Print Keys. The following six characters represent the account number of the finance company to which the total of $3000.00 is being charged. This number is shown as 654321.

This is the end of the record for the transaction. Thus, the next character on the tape will be code for Program II, indicating that the transaction lead information for another transaction is to follow immediately.

Preferably, the EDP record is absolutely complete, in that it comprises all of the information recorded on the keys of the cash register, and all of the subtotals and totals generated by the arithmetic unit. On this basis, the EDP record also includes all of the register readings which may be taken by using the Read key in Row 0. However, it is not strictly necessary to enter all of the subtotals on the EDP record, because the EDP computer is capable of arriving at the same subtotals. Moreover, it may be desirable in some cases to shorten the EDP record by omitting the register readings, which are printed in any event by the tape printer 42. Whether or not the subtotals and readings are included, the EDP record, as produced directly by the cash register, is complete in the sense that it may be used immediately and directly as the source of input data for an electronic data processing machine. A great variety of accounting reports may be prepared by the EDP machine on the basis of the EDP record. Such reports will be amply sufficient for the needs of any accounting system.

I claim:

1. In a cash register,
the combination comprising a plurality of amount keys for recording monetary amounts,
a plurality of print keys adjacent said amount keys for recording informational data,
a plurality of registers for registering and accumulating monetary amounts,
a plurality of department keys for routing monetary amounts from said amount keys to said registers,
an EDP record unit for producing an EDP record,
means connecting said EDP record unit to said registers for producing entries on the EDP record corresponding to the entries on said registers,
means connecting said print keys to said EDP record unit for producing entries on the EDP record corresponding to the data recorded on said print keys,
an arithmetic unit for accumulating monetary amounts and computing totals and subtotals,
at least one total key for controlling said arithmetic unit,
means connecting said arithmetic unit to said EDP record unit for producing entries on the EDP record corresponding to the totals computed by said arithmetic unit,
a plurality of preliminary program keys for disconnecting said amount keys from said registers and connecting said amount keys to said EDP record unit for producing entries on the EDP record corresponding to preliminary informational data recorded on said amount keys whereby both the print keys and the amount keys may be employed for entering preliminary informational data on said EDP record,
and sequence control means requiring the operation of said preliminary program keys in a predetermined sequence to insure the entry of the preliminary informational data on the EDP record.

2. In a cash register,
the combination comprising a plurality of amount keys for recording monetary amounts,
a plurality of registers for accumulating monetary amounts for various departments,
a plurality of department keys connected to said amount keys and said registers for routing each monetary amount to a selected register,
an arithmetic unit connected to said department keys for accumulating the monetary amounts corresponding to at least some of said department keys,
at least one total key connected to said arithmetic unit for causing said arithmetic unit to compute totals,
an EDP record unit for producing entries on an EDP record,
a plurality of print keys adjacent said amount keys and connected to said EDP record unit for producing entries on the EDP record corresponding to informational data recorded on said print keys,
means connecting said department keys to said EDP record unit for producing entries on the EDP record corresponding to the monetary amounts entered upon said registers,
means connecting said EDP record unit to said arithmetic unit for producing EDP record entries corresponding to the totals computed by said arithmetic unit,
at least one preliminary program key for disconnecting said amount keys from said registers and connecting said amount keys to said EDP record unit for producing entries on the EDP record corresponding to preliminary informational data recorded on said amount keys whereby both said print keys and said amount keys may be employed for making entries of preliminary informational data on the EDP record.
and sequence control means requiring the initial operation of said preliminary program key to insure the entry of said preliminary informational data on the EDP record.

3. A cash register according to claim 2,
including a plurality of such preliminary program keys,
and means connecting said preliminary program keys to said EDP record unit for making entries identifying the selected preliminary program key on the EDP record.

4. A combination according to claim 1,
including a regular program key for re-connecting said amount keys to said registers,
said sequence control means requiring the operation of said preliminary program keys before said regular program key.

5. A combination according to claim 2,
including a regular program key for re-connecting said amount keys to said registers,
said sequence control means requiring the operation of said preliminary program key before said regular program key.

(References on following page)

References Cited

UNITED STATES PATENTS

| | | | |
|---|---|---|---|
| 690,554 | 1/1902 | Bickford | 235—9 |
| 885,550 | 4/1908 | Von Pein | 235—24 |
| 2,613,872 | 10/1952 | Brown | 235—6 |
| 2,812,902 | 11/1957 | Runde et al. | 235—60 |
| 2,868,446 | 1/1959 | Harbor | 235—60 |
| 2,950,758 | 8/1960 | Englund et al. | 235—60 |
| 3,061,183 | 10/1962 | Jackson et al. | 235—60 |
| 3,069,078 | 12/1962 | Baird et al. | 235—60 |
| 3,117,720 | 1/1964 | Bogan et al. | 235—60 |
| 3,133,697 | 5/1964 | Englund et al. | 235—60 |
| 3,263,915 | 8/1966 | Englund et al. | 235—6 |

RICHARD B. WILKINSON, *Primary Examiner.*

S. A. WAL, *Assistant Examiner.*

U.S. Cl. X.R.

235—6